June 25, 1963

N. A. NELSON 3,095,145

COUNTER TYPE DATA STORAGE UNIT

Filed Oct. 12, 1959

INVENTOR.
NORMAN A. NELSON,
BY
John S. Schneider
ATTORNEY

June 25, 1963
N. A. NELSON
3,095,145
COUNTER TYPE DATA STORAGE UNIT
Filed Oct. 12, 1959
2 Sheets-Sheet 2
FIG. 3.
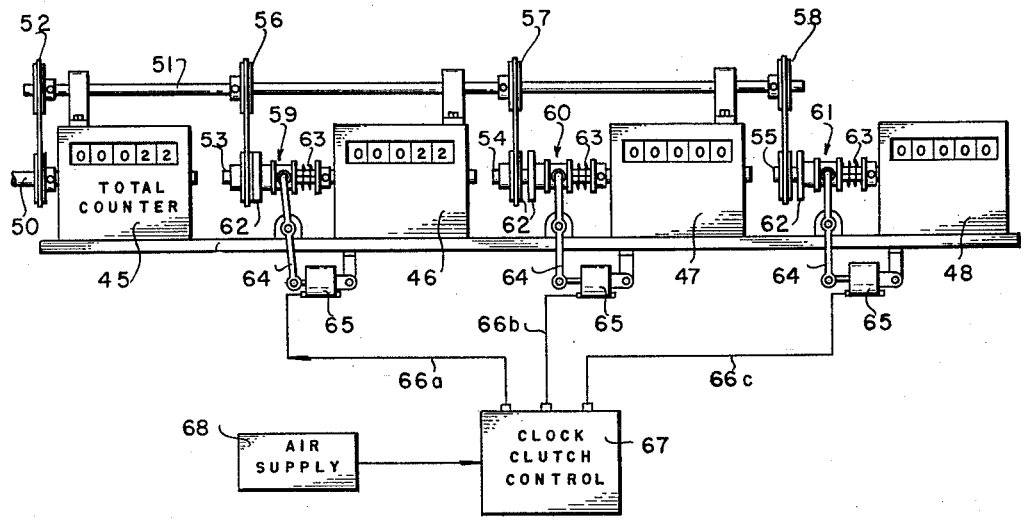
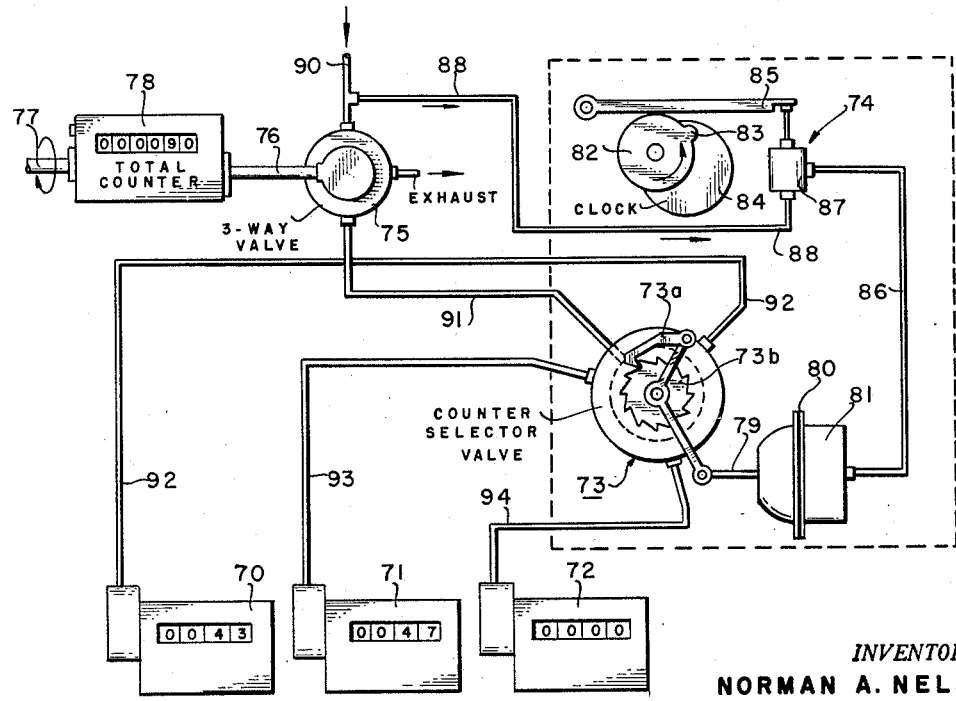
FIG. 4.
INVENTOR.
NORMAN A. NELSON,
BY
John S. Schneider
ATTORNEY.

United States Patent Office 3,095,145
Patented June 25, 1963

3,095,145
COUNTER TYPE DATA STORAGE UNIT
Norman A. Nelson, South Houston, Tex., assignor, by mesne assignments, to Jersey Production Research Company, Tulsa, Okla., a corporation of Delaware
Filed Oct. 12, 1959, Ser. No. 845,724
1 Claim. (Cl. 235—91)

A fully automatic process requires some method of storing data or transmitting data to a distant point for storage. There are many ways to store or transmit data; however, in each instance, the procedures involve recording the data by printing or by punching tapes or cards or by affecting a magnetic tape or by other apparatus whereby pulses can be accumulated. Additionally, these systems require the use of electrical circuits and expensive, complicated recorders and pilot control systems. Because of the disadvantageous features of present data storage techniques, data storage has had but limited use in oil field operations. The remoteness of many oil field processing installations, such as oil and gas metering systems, necessitates employing data storage apparatus that is rugged and simple in operation. Also, the apparatus must be designed so that the data stored may be easily gathered.

The invention to be described concerns method and apparatus for data storage that are especially adaptable for use in oil field operations.

The method of the invention relates to storing data by transmitting output indications of the occurrences of events, such as fill-dump cycles for a meter tank in an automatic metering system, in the form of pulses, or rotations or reciprocations of a shaft to any one or all of a group of odometer type counters during selected time intervals.

In one apparatus embodiment of the invention, counters are hooked together in series. One counter is connected to a movable, measurable drive member by an engageable and disengageable clutch mechanism. The other counters are connected to each other by similar clutch mechanisms. Thus, all of the counters may be driven simultaneously so that intially all of the counters record the same cumulative number of rotations. By disengaging successively each counter at predetermined times, the data shown by each counter is cumulative up to the time it is deactivated. As the operation is related to time, this means of storing data permits the determination of periodic measurements at the end of selected time periods. For example, if it is desired to determine the volume of fluid metered on a 24 hour basis, the system of the invention permits obtaining this data for each of several consecutive 24 hour time intervals.

In another apparatus embodiment of the invention, again each one of a series of counters may be selectively connected and disconnected to a movable, measurable member by an engageable and disengageable clutch mechanism. However, in this instance, a common shaft is driven continuously by the movable member and by engaging and disengaging the counters from the common shaft for predetermined time intervals, the data shown by each counter is the amount recorded for the particular desired interval.

In still another apparatus embodiment of the invention, pulses or signals indicative of measured amounts or quantities are cumulated on one or more of a series of counters during predetermined time intervals.

For a more complete description of the invention, reference to the drawings will now be made.

FIG. 3 is a schematic view similar to that shown in FIG. 1 showing a series of counters arranged according to another modification of the invention; and FIG. 4 is a schematic view similar to that shown in FIG. 1 showing a series of counters arranged according to still another modification of the invention.

Figure 1:
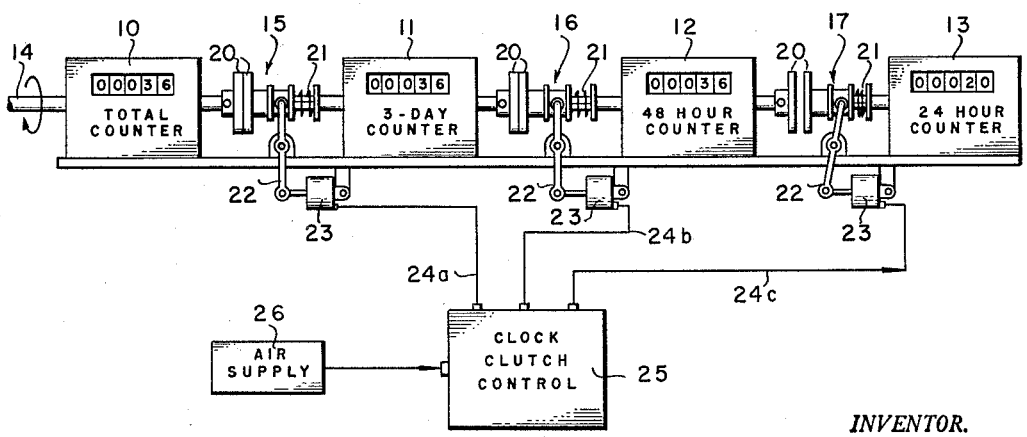
FIG. 1 is a schematic view showing a series of counters arranged according to one embodiment of the invention.

Referring to the drawings in greater detail, in FIG. 1, four counters 10, 11, 12, and 13 are shown arranged to count rotations of a rotatable drive shaft 14. Counter 10, which is directly connected to shaft 14, records the total number of rotations of shaft 14. Counter 11 releasably connects with counter 10 through clutch assembly or mechanism 15; counter 12 releasably connects to counter 11 through clutch mechanism 16; and counter 13 releasably connects to counter 12 through clutch mechanism 17. Each of the clutch mechanisms includes engageable clutch plates 20 biased into engaging position by means of compression spring 21 and disengageable by means of linkage 22 which is actuated by a fluid driven piston 23. Fluid pressure for actuating each of the pistons 23 is transmitted through conduits 24a, b, c, and a timer or clock clutch control 25 from fluid pressure supply 26.

To illustrate the operation, it is assumed that the total number of rotations of shaft 14 as well as the number of rotations of shaft 14 during successive 24 hour periods are to be measured. Initially clock control 25 prevents fluid communication between fluid pressure supply 26 and each conduit 24a, b, and c which causes all of the counters to link together through engagement of clutch plates 20 under the bias of springs 21 to thereby have each counter record the rotations of shaft 14.

At the end of the first 24 hour period, clock clutch control 25 automatically fluidly communicates fluid pressure supply 26 and piston 23 of clutch mechanism 17 through conduit 24c which causes linkage 22 to move clutch plates 20 apart against the bias of spring 21, as seen in FIG. 1. Once counter 13 disconnects from counter 12, the cumulative number of rotations of shaft 14 which occurred during the first 24 hour period is retained on counter 13. At the end of the second 24 hour period, while fluid pressure is maintained in conduit 24c, clock clutch control 25 fluidly communicates fluid pressure supply 26 and piston 23 of clutch mechanism 16 through conduit 24b causing linkage 22 to move clutch plates 20 apart against the bias of spring 21 to disconnect counter 12 from counter 11. Once disconnected counter 12 retains the number of rotations of shaft 14 which occurred during the first 48 hour period. In a similar manner, after the next 24 hour period, counter 11 disconnects from counter 10 and retains the number of rotations of shaft 14 which occurred during the first 72 hour period.

Figure 2:
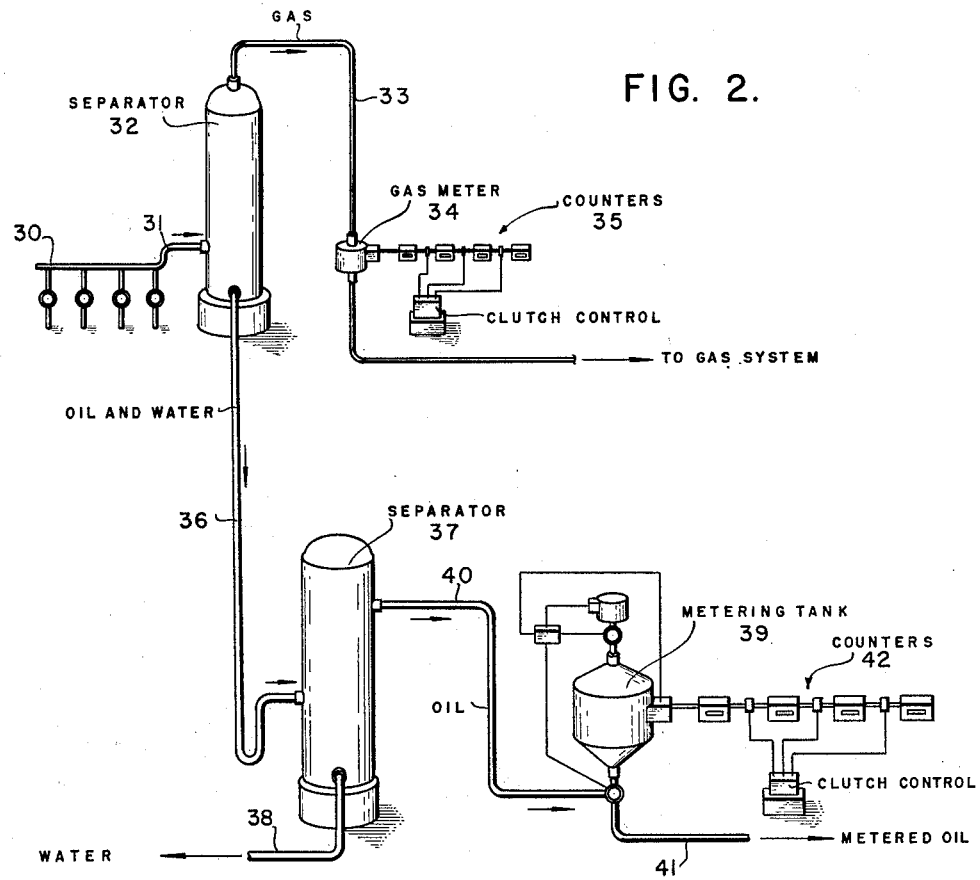
FIG. 2 is a schematic view illustrating the use of the counter-storage system in oil field operations.

An application of the apparatus is illustrated in FIG. 2. In this figure is shown an oil field system including a header 30 connected to a conduit 31 for transmitting subsurface hydrocarbon fluids to a liquid-gas separator 32. The separated hydrocarbon gases flow through a conduit 33 and a gas meter 34 to the gas system. A bank of counters, designated 35, which is similar to the bank of counters of FIG. 1, is connected to gas meter 34 to record the gas flowing through the meter at predetermined time intervals. The separated liquids are transmitted through a conduit 36 to a water-oil separator 37. The separated water is discharged from separator 37 through a conduit 38 and the separated hydrocarbon liquids are sent to a metering tank 39 through conduit 40. The metered oil is discharged from meter 39 through a conduit 41. Each fill-dump cycle of meter 39 is recorded by the bank of counters 42 which also is similar to the bank of counters of FIG. 1.

The apparatus shown in FIG. 3 illustrates a different apparatus. Four counters 45, 46, 47, and 48 are arranged to measure the rotations of a drive shaft 50. Counter 45 is directly connected to shaft 50 which, in turn, is connected to a jack-shaft 51 by the interconnecting belt and pulleys, designated 52. Jack-shaft 51 connects to shafts 53, 54, and 55 of counters 46, 47, and 48, respectively, through the belts and pulleys, designated 56, 57, and 58, respectively. Thus, rotation of shaft 50 rotates jack-shaft 51 and shafts 53, 54, and 55. Counters 46, 47, and 48 are releasably engageable with their respective shafts 53, 54, and 55, respectively, by means of clutch mechanisms 59, 60, and 61, respectively. Each clutch mechanism includes engageable clutch plates 62 biased to disengaging position by means of tension spring 63 and engageable by means of linkage 64 actuated by a fluid driven piston 65. Fluid pressure for actuating each of the pistons 65 is transmitted through conduits 66a, b, and c and a timer or clock clutch control 67 from a fluid pressure supply 68.

To illustrate the operation of this embodiment of the apparatus it is assumed that a cumulative count as well as a count for each successive 24 hour period of the number of rotations of shaft 50 is desired. Initially cumulative counter 45 and counter 46 adjacent to it are engaged to shaft 50. Counter 45 is directly connected to shaft 50 and counter 46 is connected to shaft 50 by interconnecting shafts 53 and 51. As indicated by the arrow in FIG. 3, clock clutch control 67 supplies fluid pressure from supply 68 through conduit 66a to piston 65 which moves clutch plates 62 into engagement against the bias of spring 63 and connects counter 46 to shaft 53. At this time, counters 47 and 48 are not connected to shaft 50 because clock clutch control 67 is not supplying fluid pressure through conduits 66b or 66c.

At the end of the first 24 hour period, clock clutch control 67 bleeds fluid pressure from conduit 66a and piston 65 thereby permitting spring 63 to operate clutch assembly 59 to disengage counter 46 from shaft 53. The record of the number of rotations of shaft 50 is retained on counter 46. Simultaneously, fluid pressure from supply 68 is directed through line 66b by clock clutch control 67 to engage counter 47 to shaft 54 to record the second 24 hour time interval of the rotations of shaft 50.

In a similar manner, at the end of the second 24 hour period, counter 47 is disengaged from shaft 54 by exhaust of fluid pressure from piston 65 through conduit 66b and counter 48 is engaged to shaft 55 by transmitting fluid pressure from supply 68 to conduit 66c. Counter 47 retains the number of rotations of shaft 50 during the second 24 hour period. At the end of the third 24 hour period, clock clutch control 67 exhausts conduit 66c which disengages counter 48 and shaft 55. Counter 48 retains the number of rotations of shaft 50 during the third 24 hour period.

If desired, the rotations of shaft 50 may be recorded for periods of 24 hours, 48 hours, 72 hours, and cumulatively for all of these periods. In this instance, all of the counters are initially connected to shaft 50 by fluid pressure supplied to each of the conduits 66a, 66b, and 66c through clock clutch control 67 from fluid pressure supply 68. At the end of the first 24 hour period, counter 48 is disengaged from shaft 55 by exhaust of fluid pressure from conduit 66c. At the end of the second 24 hour period, counter 47 is disengaged in a similar manner as is also counter 48 at the end of the 3 day period. Counter 45 being continuously engaged records the cumulative rotations of shaft 50.

Another modification of the apparatus of the invention is shown in FIG. 4. In this figure, three counters 70, 71, and 72 are arranged to record signals generated in response to output indications of the occurrences of events. The fluid pressure signals transmitted to the counters are first routed to a selector valve 73 which is controlled by a timer or clock valve control 74. The fluid pressure pulses are fed to the selector valve through a 3-way valve 75, the positioning of which is controlled by a rotatable shaft 76 which rotates with a shaft 77, the number of rotations of which is to be counted and recorded. The cumulative number of rotations is retained on a compensated or uncompensated counter 78. Selecter valve 73 includes an arm 73a, the end of which engages a circular saw-toothed plate 73b. Positioning of arm 73a to rotate plate 73b is controlled by linkage 79 which, in turn, is controlled by the movement of the diaphragm 80 arranged in diaphragm housing 81. Movement of diaphragm 80 is responsive to pulses controlled by timer or clock mechanism 74 which includes a rotatable element 82 provided with a cam or knob surface 83, the rotation of which is timed by means of a clock element 84. When cam surface 83 engages and raises lever 85, a pulse is transmitted through conduit 86 by way of valve 87. From a suitable source of fluid pressure, not shown, fluid pressure is maintained in conduits 88 and 90. In each revolution of 3-way valve 75, a fluid pressure pulse is transmitted from conduit 90 through conduit 91 to selector valve 73. During a predetermined time interval, the pulses transmitted through conduit 91 are transmitted to counter 70 by way of conduit 92. At the end of this time interval, which may be, for example, 24 hours, rotatable clock control element 82 raises lever arm 85 and permits a pressure pulse to pass through valve 87 and conduits 88 and 86 into diaphragm housing 81. This causes diaphragm 80 to move linkage 79 and arm 73a which, in turn, rotates saw-toothed member 73b clockwise. This movement fluidly communicates conduit 91 and a conduit 93 which connects to counter 71 and prevents fluid communication between conduits 91 and 92. Similarly, at the end of the next 24 hour period, another pulse is transmitted to diaphragm 80 which causes linkage 79 to rotate saw-toothed member 73B to fluidly communicate conduits 91 and 94 and to prevent fluid communication between conduits 91 and 92 and 91 and 93, respectively. Thus, in each 24 hour period, the number of pulses transmitted through conduit 91 which is responsive to, for example, the number of fill-dump cycles of a metering tank, is recorded on the various counters 70, 71, and 72 and the cumulative counts are recorded on counter 78.

Because the pulse-operated counters of FIG. 4 and the clock controls of FIGS. 1 and 3 are conventional, commercially available devices, they have not been described in detail.

The apparatus is especially suitable for use with metering apparatus which compensates for volumetric variations caused by factors which effect the measured volume of the liquid, such as temperature, BS & W, gravity, etc. For example, it is readily adaptable for use with the apparatus shown and described in U.S. patent application Ser. No. 645,264, entitled, "Temperature Compensator for Intermittent Dump Meter," by Stephen S. Brown.

Having fully described the nature, objects, elements, and operation of my invention, I claim:

A data storage unit for storing information relating to filling and dumping of an oil metering vessel comprising a rotatable shaft adapted to rotate in response to each fill-dump cycle of said metering vessel; a first counter mechanically connected to said shaft for registering the total number of fill-dump cycles during a selected time interval; a plurality of second counters each fluid pulse operated and adapted to register the number of fill-dump cycles of said metering vessel for different selected portions of said selected time interval; and means including a fluid pulse source interconnecting said shaft and said second counters for actuating them including a fluid pulse movable counter selector valve having selected positions, valve means connected to said shaft and adapted to transmit fluid pulses to said second counters via said counter selector valve periodically in response to rotation of said shaft, and timing means connected to said counter selector valve adapted to cause said counter selector valve to move from one selected position to another at different selected portions of said selected time interval to thereby register on each of said second counters the number of fill-dump cycles that occur during a different selected portion of said selected time interval.

References Cited in the file of this patent

UNITED STATES PATENTS

| | | |
|---|---|---|
| 1,010,662 | McNab | Dec. 5, 1911 |
| 1,357,361 | Stuber | Nov. 2, 1920 |
| 1,556,186 | Wall | Oct. 6, 1925 |
| 1,805,665 | Hough | May 19, 1931 |
| 1,886,555 | Krause | Nov. 8, 1932 |
| 2,024,492 | Wallace | Dec. 17, 1935 |
| 2,043,295 | Lake | June 9, 1936 |
| 2,207,715 | Bumstead | July 16, 1940 |
| 2,368,761 | Hogan | Feb. 6, 1945 |
| 2,469,655 | Leathers | May 10, 1949 |
| 2,838,237 | Spaunburg et al. | June 10, 1958 |
| 2,985,368 | Kohler | May 23, 1961 |

OTHER REFERENCES

1959 Product Design Catalogue file, received in Patent Office Feb. 19, 1959 (only page 4 of Sect. 6a Do relied on).